June 15, 1965  A. L. WOMACK ETAL  3,189,134
PORTABLE SKYLINE YARDER
Filed Nov. 27, 1961  5 Sheets-Sheet 1
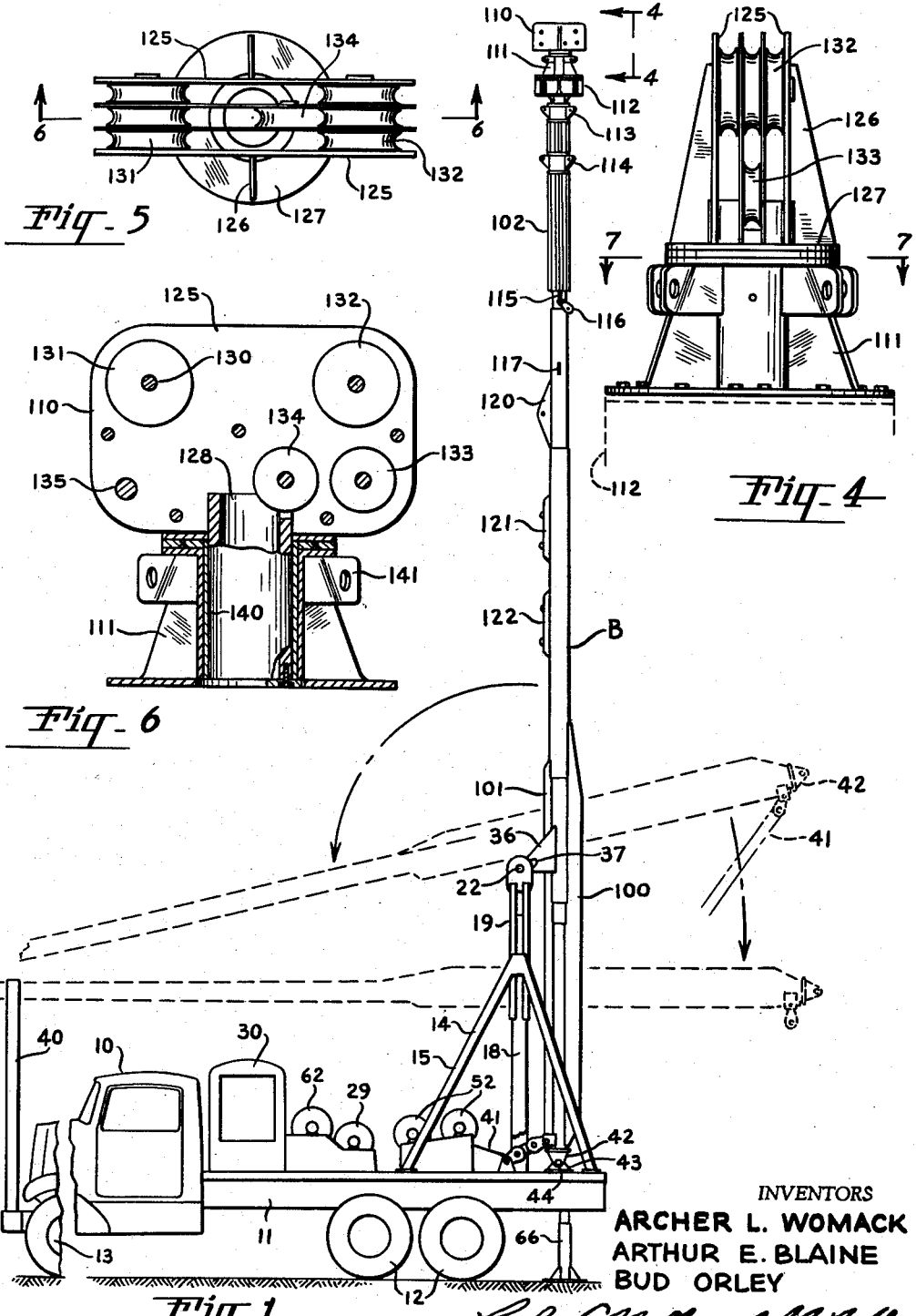
INVENTORS
ARCHER L. WOMACK
ARTHUR E. BLAINE
BUD ORLEY

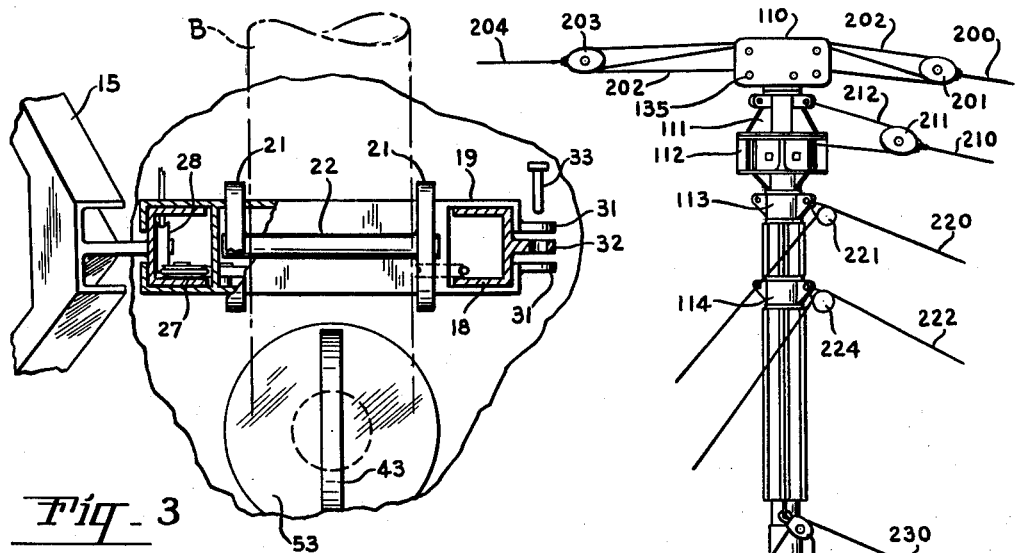

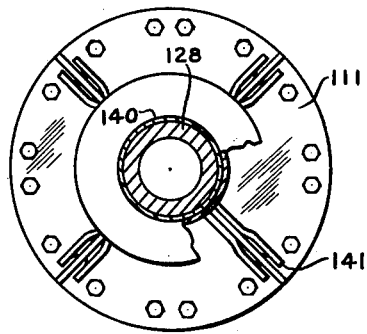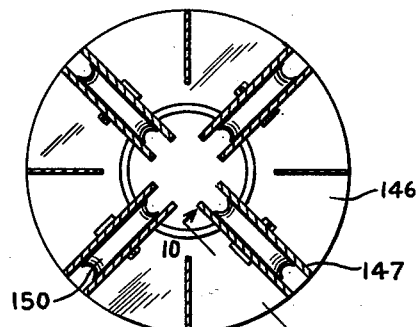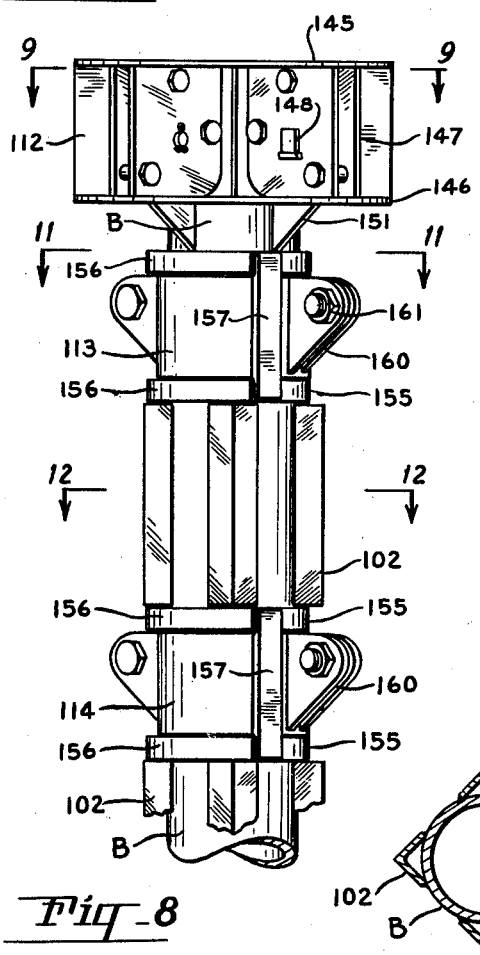

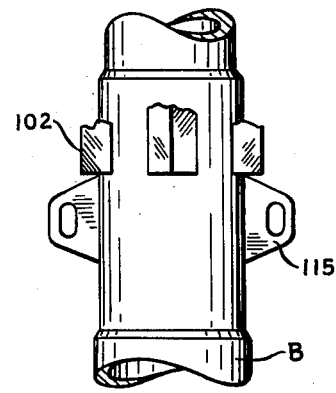
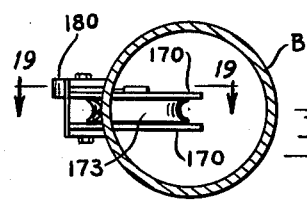
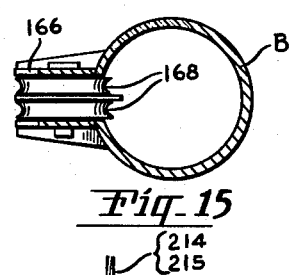
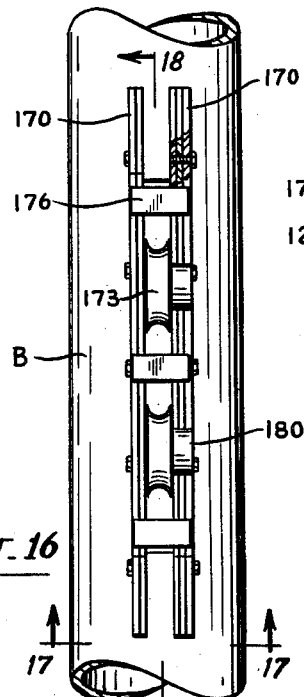
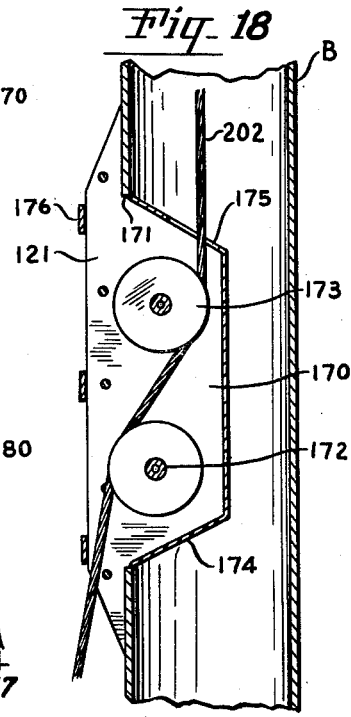
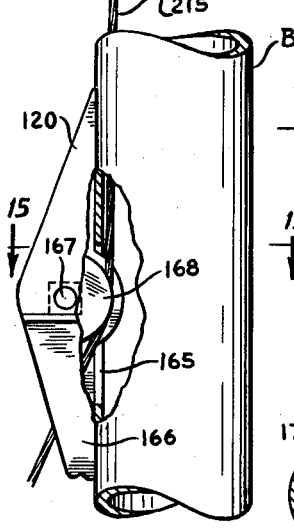
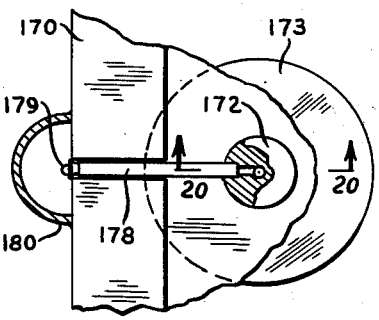
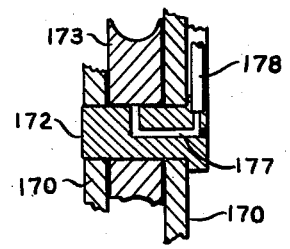
INVENTORS
ARCHER L. WOMACK
ARTHUR E. BLAINE
BUD ORLEY

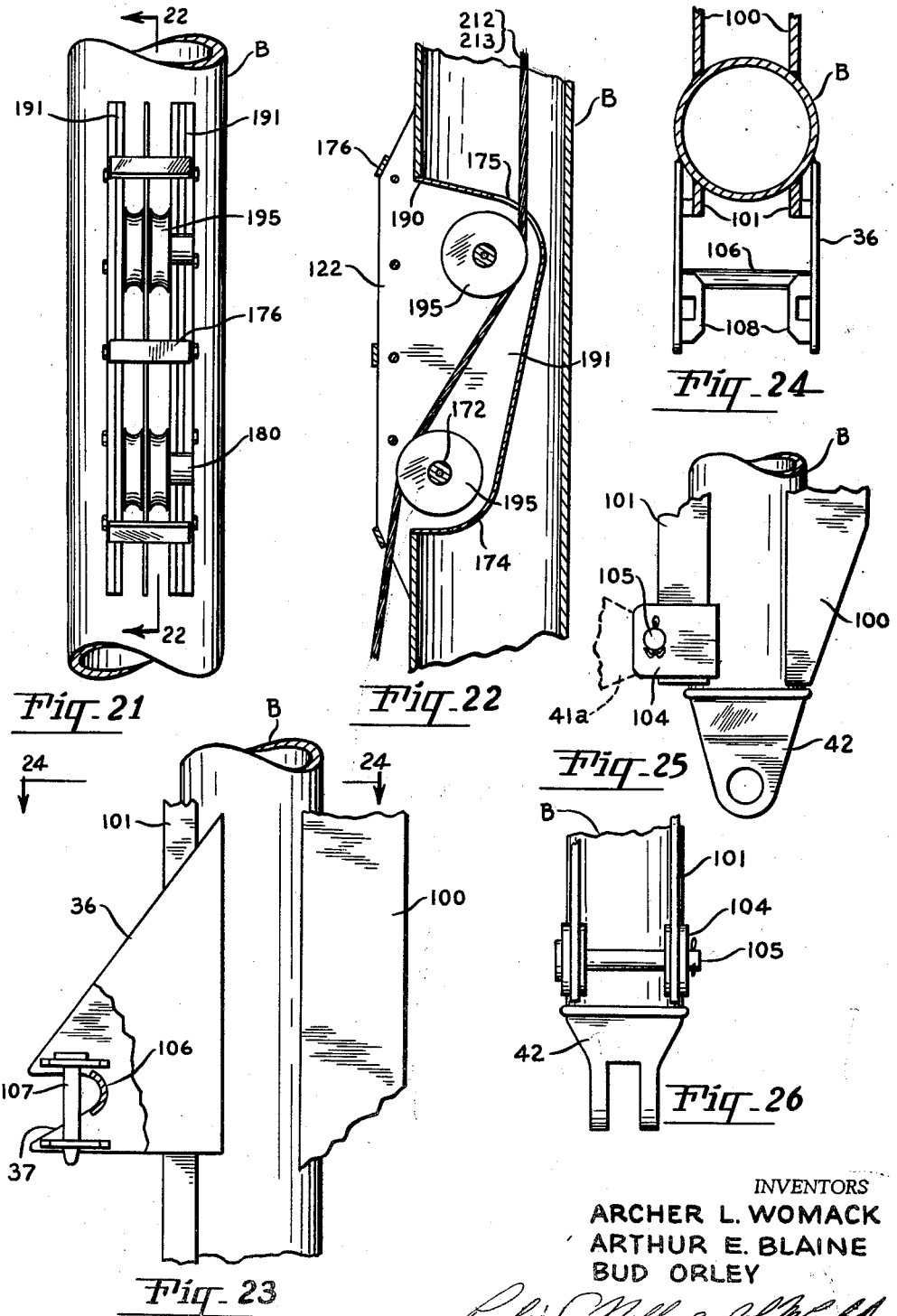

United States Patent Office 3,189,134
Patented June 15, 1965

---

3,189,134
PORTABLE SKYLINE YARDER
Archer L. Womack, Arthur C. Blaine, and Bud Orley, Castle Rock, Wash., assignors to Weyerhaeuser Company, Tacoma, Wash., a corporation of Washington
Filed Nov. 27, 1961, Ser. No. 154,983
8 Claims. (Cl. 189—11)

This application is a continuation-in-part of my prior co-pending application Serial No. 21,786, filed April 12, 1960, and titled Portable Yarder, now U.S. Patent No. 3,109,522, granted November 5, 1963. In said prior application there is disclosed a portable boom or tower which may be carried by a vehicle such as a truck in a horizontal position extending lengthwise over the top of the truck. The tower is erected at the site of a logging operation by power means on the truck which is provided for pulling in logs and the like by means of cables. When erected, the bottom of the tower rests on the truck and the top is stabilized by guy cables connected to several points of anchorage at a distance from the tower. The tower thus serves the general purpose of a spar tree but has the advantage of portability and easy rigging and dismantling. Such a tower can be readily set up where no spar tree is available or where the rigging of the usual spar tree would be too laborious or time-consuming for the amount of work to be done at that location.

This invention relates to a portable skyline yarder, particularly for use in logging operations.

The general object of the present invention is to provide an improved portable boom or tower which is adapted for a skyline-type of operation as well as the simple yarder-type of operation performed by my prior yarder.

Other objects are to provide an improved boom or tower for the purpose described having a skyline fair-lead which is rotatable to support one end of a skyline extending in any direction from the tower, to provide an improved cable rigging for skyline yarding, to provide novel and improved sheave arrangements and mountings for handling the greater number of cables necessary in a skyline operation and to provide sheave arrangements for keeping a plurality of cables out of contact with each other inside a slender light weight hollow tower tube and for leading the cables out of the tower tube to a plurality of cable drums on the vehicle which supports the tower.

In the present arrangement the top of the tower carries a skyline fair-lead mounted on a vertical trunnion to rotate through 360° so that the skyline may extend in any direction from the tower. However, it will be apparent that as a practical matter the rotation will be less than 360° since it is not customary to bring logs in over the truck itself. The skyline is maintained under suitable tension by an anchor cable extending in the opposite direction and a heel tackle between the skyline and anchor cables for producing and maintaining such tension. A guy line fair-lead for a plurality of guy lines is mounted below the skyline fair-lead. The guy line cables and the heel tackle cable all pass down through the hollow tower tube spaced apart from each other and emerge from the tower tube at different points for tensioning by cable drums on the vehicle. The tower is carried and erected on the vehicle in the same manner as shown and described in my prior application.

Still other objects and advantages will become apparent and the invention will be better understood from the following detailed description of the preferred embodiment illustrated in the accompanying drawings. Various changes may be made, however, in the details of construction and arrangement of parts and certain features may be used without others. All such modifications within the scope of the appended claims are included in the invention.

In the drawings:

FIGURE 1 is a side elevation view of the present tower shown in full lines in erected position with the rigging omitted, the broken lines showing the tower in a horizontal position for transportation and in an intermediate position during erection or lowering;

FIGURE 2 is a fragmentary rear elevation view of the truck showing a part of the tower-erecting apparatus;

FIGURE 3 is a view taken on the line 3—3 of FIGURE 2;

FIGURE 4 is a front elevation view of the skyline fair-lead taken on the line 4—4 of FIGURE 1;

FIGURE 5 is a top plan view of the skyline fair-lead;

FIGURE 6 is a sectional view taken on the line 6—6 of FIGURE 5;

FIGURE 7 is a cross sectional view taken on the line 7—7 of FIGURE 4;

FIGURE 8 is an elevation view of a section of the tower beneath the skyline fair-lead;

FIGURE 9 is a cross sectional view taken on the line 9—9 of FIGURE 8;

FIGURE 10 is a sectional view taken on the line 10—10 of FIGURE 9;

FIGURE 11 is a cross sectional view taken on the line 11—11 of FIGURE 8;

FIGURE 12 is a cross sectional view taken on the line 12—12 of FIGURE 8;

FIGURE 13 is a side elevation view of a section of the tower below that shown in FIGURE 8;

FIGURE 14 is a side elevation view of the back guy lines sheave assembly;

FIGURE 15 is a cross sectional view taken on the line 15—15 of FIGURE 14;

FIGURE 16 is a rear elevation view of the skyline sheave assembly;

FIGURE 17 is a cross sectional view taken on the line 17—17 of FIGURE 16;

FIGURE 18 is a longitudinal sectional view taken on the line 18—18 of FIGURE 16;

FIGURE 19 is a sectional view taken on the line 19—19 in FIGURE 17;

FIGURE 20 is a sectional view taken on the line 20—20 of FIGURE 19;

FIGURE 21 is a rear elevation view of the front guy lines sheave assembly;

FIGURE 22 is a longitudinal sectional view taken on the line 22—22 of FIGURE 21;

FIGURE 23 is a side elevation view of the upper pivot support structure;

FIGURE 24 is a cross sectional view taken on the line 24—24 of FIGURE 23;

FIGURE 25 is a side elevation view of the lower pivotal support;

FIGURE 26 is a rear elevation view of the structure shown in FIGURE 25; and

FIGURE 27 is a view of the upper portion of the tower, showing the rigging for a skyline yarding operation.

Referring first to FIGURE 1, there is generally indicated at 10 a vehicle such as a truck having a chassis 11 supported on the rear wheels 12 and front wheels 13. The rear end of chassis 11 carries a frame structure 14 which includes a pair of oppositely disposed inclined side members 15. As shown in FIGURE 2, the lower ends of side members 15 are fixedly connected at 16 to the truck chassis while their upper ends are connected through members 17 to a pair of vertically disposed parallel track members 18.

A vertically movable slide 19 is mounted for linear movement on the tracks 18. On the upper end of slide 19 is a pair of spaced plates 21 equipped with a cross-mounted pivot pin 22 which is used in carrying the tower B in horizontal position and in erecting the tower. A cable 23 has one end 24 secured at an upper portion of one of the tracks 18 and extends downwardly about a first pulley 25 carried by a lower portion of slide 19 and then upwardly around an opposite pulley 26 on the slide to a pulley 27 by the other track 18. The cable then extends downwardly about a pulley 28 from which it extends to a winding drum 29 on the truck chassis 11. This and other winding drums presently to be described are powered by a conventional power plant 30.

By the arrangement just described the slide 19 may be raised by means of the cable 23 to the upper position shown in FIGURE 1. When the cable is paid out from drum 29 the slide will descend by gravity to the lower position shown in FIGURE 2. When the slide is in its raised position, a pair of ears 31 carried by the slide are adapted to be aligned with ears 32 on the rails 18. Both ears 31 and 32 are apertured to receive a pin 33 for locking the slide in raised position.

At a distance from its lower end the tower B is equipped with a pair of spaced ears 36 having notches 37 adapted to engage the pivot pin 22. In travelling position the notches 37 engage the pin 22 and the slide 19 is lowered to its FIGURE 2 position. The tower is thereby disposed horizontally as indicated by the lowermost and horizontal broken lines in FIGURE 1, the upper end of the tower being supported by an upright frame 40 on the front end of the truck.

When it is desired to erect the tower the slide 19 is first moved upward by means of cable 23 whereby the lower end of the tower is raised to the upper broken line position shown in FIGURE 1. A cable 41 is attached to the lower end of the tower and by tensioning the cable by means of a winch or capstan drum on the truck, the tower is rotated about the pin 22 as an axis to the full line upright position shown in FIGURE 1. An apertured base fitting 42 on the tower is thereby aligned with a corresponding apertured base support 43 on the truck and the two parts are connected by a pin 44. As disclosed in my prior application, the base support 43 is mounted on a turntable 53 which is rotatably mounted on the truck chassis 11 but, for use with the present tower, the base support 43 is not required to be rotatable. After the tower has been guyed in working position, the pin 22 is not necessary to stabilize the tower and the ears 36 may move away from the pin as shown in FIGURE 1, although the guy lines have been omitted in this view.

Suitable legs 66 are provided on opposite sides of the truck chassis so that the tower loads and stresses will not be transmitted through the springs of the truck. This provides a solid and stationary base for the tower, although in adjusting the skyline and guy lines presently to be described, the tower is free to rock fore and aft on its base supporting pin 44. For reference purposes the side of the tower facing the truck is designated as its back or rear side and the opposite side which faces away from the truck is designated as its front side.

The tower-carrying and erecting structure thus far described is the same as that shown in my prior application. The construction of the new tower will now be described in detail.

The tower B preferably comprises a circular steel tube similar to a ship's boom wherein the lower end is of larger diameter than the upper end. The lower end is stiffened and reinforced by welding elongated strips or plates 100 and 101 to the outside of the tube as shown in FIGURE 1. The upper portion is reinforced by welding angle irons 102 to the tube as shown in FIGURES 1 and 12.

The previously mentioned base end fitting 42 is shown in FIGURES 25 and 26. A pair of apertured ears 104 on the rear side of the tower tube receives a pin 105 to secure the cable 41 or a pulley block 41a on this cable used in erecting the tower.

The details of construction of the carrying and erecting ears 36 are shown in FIGURES 23 and 24. These ears are interconnected at the inner end of notch 37 by an arcuate member 106 to provide a bearing on the pin 22 in the horizontal carrying position of the tower. When the tower is being carried in transportation and when it is being erected, pin 22 is held in the closed end of notch 37 by a pair of pins 107. Apertured lugs 108 above and below the notch 37 provide guides to receive the pins 107. Pins 107 may be removed after the guy lines have been secured, in order to allow the tower to pivot on its base pin 44 as previously described.

Referring back to FIGURE 1, the upper portion of the tower is equipped with a number of facilities to accommodate the various cables employed in supporting and tensioning the skyline and stabilizing and operating the yarder. At the top of the tower is a skyline and heel-tackle fair-lead 110. Immediately below this fair-lead is a guy line tail hold assembly 111. Below this is a guy line fair-lead assembly 112. The cables from both fair-leads pass down inside the tower tube.

Below the guy line fair-lead are top and bottom slip collar lug assemblies 113 and 114 for supporting exterior cable pulleys. Just below reinforced portion 102 are lugs 115 for supporting a pulley 116 for a slack pulling cable. Other lugs 117 are provided for hanging a straw line block or for other purposes.

At lower levels provision is made at intervals for the cables from both fair-leads to emerge from the interior of the hollow tower in the direction of the cable drums on the truck. These fittings are referred to as tower sheave assemblies, the uppermost being a back guy line sheave assembly 120. Below this is a skyline heel tackle sheave assembly 121 and still lower is the front guy line sheave assembly 122. All of these sheave assemblies are on the rear side of the tower tube.

The details of construction of the skyline and heel tackle fair-lead 110 are shown in FIGURES 4, 5 and 6. This fair-lead has a frame or shell comprising a pair of vertical side plates 125 braced by gusset plates 126 in upstanding relation on a circular base plate 127. These parts are welded to each other and to a vertical trunnion tube 128. The side plates 125 support sheave pins or axles 130 for a plurality of sheaves. At the top rear side of the fair-lead is a group of three tail tackle sheaves 131 on a single pin and at the top front side a group of three sheaves 132 on a single pin. In the lower front side of the fair-lead is a pair of single guide sheaves 133 and 134, the latter being in a position to deliver the heel tackle cable down through the center of hollow trunnion 128. In the lower rear side of the fair-lead frame is a tail hold pin 135 for anchorage of one end of the heel tackle cable. The terms "front" and "rear" are referred to the front and rear sides of the tower in FIGURE 1, it being assumed that the skyline will extend to the right and the skyline anchor to the left in FIGURES 1, 5 and 6.

Fair-lead trunnion 128 rotates in a bushing 140 in guy line tail hold assembly 111 which is bolted to the top of the guy line fair-lead 112 as shown in FIGURE 4. Guy line tail hold assembly 111 is equipped with pairs of apertured ears 141 to receive pins in the cable end eyes. Thus, the fair-lead 110 is mounted to turn on a vertical axis relative to the fair-lead 112 which is fixed to the top of the tower tube and does not turn.

Details of construction of the guy line fair-lead are shown in FIGURES 7–10. The frame or shell of this fair-lead comprises top and bottom horizontal annular plates 145 and 146 interconnected by four pairs of vertical web plates 147. Each pair of plates 147 carries a sheave pin or axle 148 for one of the four guy line sheaves 150. These sheaves are arranged to deliver four guy lines down through the hollow tower in spaced relation around the central tackle line from sheave 134 in the upper fair-lead. This sheave arrangement is shown in FIGURE 9. The two front guy lines are led down the front side of the tower and the two back guy lines are led down the back side of the tower. This fair-lead is fixedly connected to the top end of the tower tube by means of a plurality of radial gusset plates 151 which are welded to the tower tube and to fair-lead bottom plate 146.

Slip collars 113 and 114 are mounted to rotate on the tower through approximately three quarters of a circle, this construction being shown in FIGURES 8 and 11. Each slip collar is confined between upper and lower stationary collars 155 which are welded to the tower tube. Each stationary collar 155 has welded on its periphery an arcuate stop bar 156 having an arcuate length of about 77°. Welded on each slip collar 113 and 114 is a vertical bumper bar 157 with its ends over-riding the stationary collars 155. The slip collars will rotate until bumper bar 157 encounters one end or the other of stop bars 156. Each slip collar is equipped with two pairs of outstanding apertured ears 160 to receive bolts or pins 161 for supporting pulley blocks. The upper pulley block is for the receding line of the yarder and the lower pulley block is for the skidding line, only one pair of ears on each slip collar being used in a particular installation.

FIGURES 14 and 15 illustrate the details of construction of the back guy line sheave assembly 120. The tower tube is provided with a vertical slot 165 on its back side and on opposite sides of this slot is welded a pair of vertical triangular gusset plates 166. These gusset plates support a sheave pin 167 for a pair of sheaves 168 which project into the slot far enough to receive the pair of back guy line cables close to the back side of the tower tube. The cables pass around sheaves 168 and leave the tower by way of slot 165 inclined rearwardly toward the cable drums for these particular guy cables.

The details of construction of the skyline heel tackle sheave assembly 121 are shown FIGURES 16–20. This assembly comprises a pair of sheave plates 170 extending into a vertical slot 171 in the back side of the tower tube. These sheave plates carry sheave pins 172 for a pair of sheaves 173 arranged to receive the skyline heel tackle cable in the center of the tower and direct it out rearwardly to its cable drum on the truck.

The side plates or sheave plates 170 are connected together within the tower tube by a web plate 174 which is cut away or provided with an opening at 175 to admit the cables. On the outside of the tower the sheave plates 121 are connected together by three transverse bars 176. FIGURES 19 and 20 illustrate lubricating means for the two sheaves. Each sheave pin 172 is drilled at 177 to provide a grease passage. The outer end of this grease passage communicates with a tube 178 which is equipped at its outer end with a conventional grease gun lubrication fitting 179. This fitting is protected by a guard 180.

The front guy line sheave assembly 122 is of generally similar construction as shown in FIGURES 21 and 22. Here the tower tube is provided with a vertical slot 190 to receive a pair of vertical sheave plates 191. Mounted between these plates are two pairs of sheaves 195 to receive the front guy lines from the front side of the tower tube and lead them out rearwardly to their respective cable drums on the truck. The sheaves are lubricated by means as shown in FIGURES 19 and 20.

The rigging of the tower for a skyline-type of logging operation is shown in FIGURE 27. The remote end of skyline cable 200 is connected to some available high point of anchorage in the surrounding topography such as the top of a spar tree, not shown. The cable may extend in any direction from the tower B as, for example, from the front side as shown. The lower end of the skyline is dead-ended at a pulley block 201. The skyline is tensioned to provide an elevated trolley or track by means of a heel tackle cable 202 reeved through skyline tackle block 201 and a heel tackle block 203 on the opposite side of the tower directly in line with the skyline. Block 203 is connected with a skyline anchor cable 204. In order to get the two cables 200 and 204 in alignment, the truck is stationed so that the tower B will be on a line between the spar tree which anchors the remote end of cable 200 and the anchor point for the remote end of cable 204. In this way the cable tension imposes no stress on the tower and the tower merely holds the cables 200 and 204 in elevated position.

One end of heel tackle cable 202 is dead-ended at fair-lead tail hold pin 135. The cable makes several passes around blocks 201 and 203 and over sheaves 131 and 132 which thereby support cables 200 and 204. The other end of cable 202 passes over fair-lead sheaves 133 and 134 in FIGURE 6 and down through the center of the tower. This cable emerges from the inside of the tower at sheave assembly 121. When cable 202 is tightened it is pulled in from both sides of the tower, leaving the tower substantially in its original position as the sag is pulled out of both cables 200 and 204 simultaneously. When skyline cable 200 is loaded with the weight of a log, the tower may pivot to some extent on its base pin 44 as anchor cable 204 and the back guy lines are subjected to greater tension and the front guy lines are somewhat slackened.

Normally there are four guy cables 210 spaced approximately 90° apart around the tower. Each of these guy cables is dead-ended in a pulley block 211 on a tightening guy line such as the guy line 212 which is the only one shown for convenience of illustration. One end of each of these guy lines is fastened to the tail hold assembly 111 as shown while another portion of the line passes over one of the pulleys in guy line fair-lead 112. The front guy line 212 and its companion front guy line 213, not shown in FIGURE 27, pass down in the front side of the tower tube to front guy line sheave assembly 122, as shown in FIGURE 22. The back guy lines 214 and 215, not shown in FIGURE 27, pass down in the back side of the tower to back guy line sheave assembly 120, as shown in FIGURE 15. Thus, the four guy lines may be individually tightened by the cable drums on the truck to stabilize the top of the tower.

FIGURE 27 also shows receding line 220 passing over a pulley block 221 hung on top slip collar 113, and a skidding line 222 passing over a pulley block 224 hung on bottom slip collar 114. These lines lead to separate cable drums on the truck. Similarly, slack pulling line 230 passes over pulley block 116 to a cable drum or capstan on the truck. The functions of these lines are well known in the logging industry and so further detailed description and illustration of these features are deemed unnecessary to an understanding of the invention by persons skilled in the art.

In order to tension and wind in the various lines and cables referred to, the truck is provided with a sufficient number of cable drums as shown, for example, at 29, 52 and 62. There are other drums behind those appearing in FIGURE 1, operated from engine 30 and equipped with conventional clutches, brakes and locking devices for the proper control of all the lines and cables shown.

Having now described my invention and in what manner the same may be used, what I claim as new and desire to protect by Letters Patent is:

1. In a portable skyline yarder, a tubular tower, means for leading a skyline tensioning line down the center of the tower tube, means for leading a pair of front guy tensioning lines down in the front side of said tower tube, means for leading a pair of back guy tensioning lines down in the back side of said tower tube, and means for leading all of said lines out of the back side of said tower tube at a distance above its lower end.

2. In a portable skyline yarder, a tubular tower, means for leading a skyline tensioning line down the center of the tower tube, means for leading a pair of front guy tensioning lines down in the front side of said tower tube, means for leading a pair of back guy tensioning lines down in the back side of said tower tube, means for leading said front guy tensioning lines out of the back side of said tower tube at a distance above its lower end, means for leading said back guy tensioning lines out of the back side of said tower tube at a point above said last means, and means for leading said skyline tensioning line out of the back side of said tower tube at a point between said last two means.

3. In a portable skyline yarder, a skyline cable, a skyline anchor cable, a heel tackle interconnecting said cables and having a heel tackle line for tensioning said cables, a tubular tower, a skyline fair-lead mounted on top of said tower for rotation about the axis of the tower, sheaves in said fair-lead supporting said heel tackle, one end of said heel tackle line being connected with said fair-lead, a sheave in said fair-lead leading the other end of said heel tackle line down the center of said tower, a guy line fair-lead assembly below said skyline fair-lead, sheaves in said guy line fair-lead assembly leading a pair of front guy lines down in the front side of said tower, sheaves in said guy line fair-lead assembly leading a pair of back guy lines down in the back side of said tower, an upper sheave assembly leading said back guy lines out of the back side of said tower, a lower sheave assembly leading said front guy lines out of the back side of said tower, and an intermediate sheave assembly leading said heel tackle line out of the back side of said tower.

4. In a portable skyline yarder, a tubular tower, a skyline fair-lead mounted on top of said tower for rotation on the axis of the tower, sheaves in said fair-lead for supporting a skyline, a sheave in said fair-lead arranged to pass a skyline tensioning line down the center of the tower, a guy line fair-lead assembly below said skyline fair-lead, sheaves in said last fair-lead arranged to pass a pair of front guy lines down in the front side of said tower, sheaves in said last fair-lead arranged to pass a pair of back guy lines down in the back side of said tower, a sheave assembly in the back side of said tower arranged to pass said front guy lines out of the tower, a sheave assembly in the back side of said tower above said last sheave assembly arranged to pass said skyline tensioning line out of the tower, and a sheave assembly in the back side of said tower above said last sheave assembly arranged to pass said back guy lines out of the tower.

5. In a portable skyline yarder, a tubular tower, a guy line fair-lead shell fixedly mounted on the top end of said tower tube, radial guy line sheaves in said fair-lead arranged to lead guy lines into opposite sides of said tower tube, a vertical bushing fixedly mounted on top of said shell, a skyline fair-lead having a hollow vertical trunnion rotatably mounted in said bushing, skyline supporting sheaves in said skyline fair-lead, and a sheave in said skyline fair-lead arranged to lead a skyline tensioning line down through said hollow trunnion and through the center of said guy line fair-lead to the center of said tower tube between said guy lines.

6. In a portable skyline yarder, a tubular tower, means for leading a skyline tensioning line down the center of the tower tube, means for leading a pair of front guy tensioning lines down in the front side of said tower tube, means for leading a pair of back guy tensioning lines down in the back side of said tower tube, means for receiving said front guy tensioning lines at the front side of said tower tube at a distance above its lower end and for leading said lines out of the back side of said tower tube, means for receiving said back guy tensioning lines at the back side of said tower tube at a point above said last means and for leading said lines out of the back side of said tower tube, and means for receiving said skyline tensioning line at the center of said tower tube at a point between said last two means and for leading said line out of the back side of said tower tube.

7. In a portable skyline yarder, a tubular tower, a skyline fair-lead mounted on top of said tower for rotation about the axis of the tower, sheaves in said fair-lead for supporting a skyline, a sheave in said fair-lead arranged to pass a skyline tensioning line down the center of the tower, a guy line fair-lead assembly below said skyline fair-lead, sheaves in said last fair-lead arranged to pass a pair of front guy lines down in the front side of said tower, sheaves in said last fair-lead arranged to pass a pair of back guy lines down in the back side of said tower, a sheave assembly in the back side of said tower arranged to receive said front guy lines at the front side of said tower and to pass said front guy lines out of the back side of said tower, a sheave assembly in the back side of said tower above said last sheave assembly arranged to receive said skyline tensioning line at the center of said tower and to pass said line out of the back side of said tower, and a sheave assembly in the back side of said tower above said last sheave assembly arranged to receive said back guy lines at the back side of said tower and to pass said lines out of the back side of said tower.

8. In a portable skyline yarder, a tubular tower, a guy line fair-lead assembly fixedly mounted on the top end of said tower tube, sheaves in said fair-lead assembly arranged to pass a pair of front guy lines down in the front side of said tower, sheaves in said last fair-lead assembly arranged to pass a pair of back guy lines down in the back side of said tower, a vertical bushing fixedly mounted on top of said fair-lead assembly, a skyline fair-lead assembly having a hollow vertical trunnion rotatably mounted in said bushing, skyline supporting sheaves in said skyline fair-lead, and a sheave in said skyline fair-lead arranged to lead a skyline tensioning line down through said hollow trunnion and through the center of said guy line fair-lead assembly into the center of said tower tube between said guy lines, a pair of slip collars at intervals below said guy line fair-lead mounted for rotation about the axis of said tower, means for supporting pulley blocks on said slip collars, and means for receiving the respective lines from said fair-leads at their respective positions within said tower at a distance above its lower end and for leading said lines from said fair-leads out of the back side of said tower.

References Cited by the Examiner
UNITED STATES PATENTS

| | | | |
|---|---|---|---|
| 1,798,397 | 3/31 | Berger | 189—11 |
| 2,008,785 | 7/35 | De Vou | 189—11 |
| 2,694,474 | 11/54 | Meany | 189—15 X |
| 2,985,429 | 5/61 | LeTourneau | 254—139.1 |
| 3,045,973 | 7/62 | Slagle | 254—139.1 |
| 3,050,285 | 8/62 | Troyer | 254—139.1 |

RICHARD W. COOKE, JR., *Primary Examiner.*

JOEL REZNEK, JACOB L. NACKENOFF, *Examiners.*